(12) United States Patent
Ligorio et al.

(10) Patent No.: US 8,042,705 B2
(45) Date of Patent: Oct. 25, 2011

(54) CAP FOR SAFELY FILLING AND CLOSING AN ENGINE OIL TANK, IN PARTICULAR OF AN AIRCRAFT ENGINE

(75) Inventors: Claudio Ligorio, Brindisi (IT); Davide Cascione, Martina Franca (IT)

(73) Assignee: Avio S.p.A., Strada del Drosso (IT)

( * ) Notice: Subject to any disclaimer, the term of this patent is extended or adjusted under 35 U.S.C. 154(b) by 930 days.

(21) Appl. No.: 11/983,429

(22) Filed: Nov. 8, 2007

(65) Prior Publication Data

US 2008/0135553 A1    Jun. 12, 2008

(30) Foreign Application Priority Data

Nov. 10, 2006 (IT) .............................. TO2006A0802

(51) Int. Cl.
*F17C 13/06* (2006.01)
*B65D 51/16* (2006.01)
*B65D 51/18* (2006.01)
(52) U.S. Cl. ................. 220/582; 220/203.05; 220/254.1
(58) Field of Classification Search ............ 220/203.05, 220/203.06, 203.07, 203.19, 203.23, 203.27, 220/203.29, 254.1, 254.3, 254.4, 254.6, 254.9, 220/255; 33/727, 730, 731; 137/386
See application file for complete search history.

(56) References Cited

U.S. PATENT DOCUMENTS

| | | | |
|---|---|---|---|
| 2,297,850 A * | 10/1942 | Woolery | 33/727 |
| 3,474,884 A | 10/1969 | Braun | |
| 3,662,470 A * | 5/1972 | Sasgen | 33/731 |
| 5,373,957 A * | 12/1994 | Gryc | 220/86.1 |
| 5,554,419 A | 9/1996 | Chung et al. | |
| 6,009,920 A | 1/2000 | Palvoelgyi et al. | |
| 6,073,618 A | 6/2000 | Sanders et al. | |
| 2004/0065512 A1 | 4/2004 | Gates et al. | |

* cited by examiner

*Primary Examiner* — Bryon Gehman
*Assistant Examiner* — Shawn Braden
(74) *Attorney, Agent, or Firm* — Ladas & Parry LLP

(57) ABSTRACT

A cap, for safely filling and closing an engine oil tank, in particular of an aircraft engine, has an elongated tubular body for feeding oil into the tank; a removable cover body for closing an end portion of the tubular body; an oil feed valve located close to the end portion of the tubular body and movable between an open position, allowing oil flow into the tank, and a closed position, preventing oil outflow from the tank; a filter upstream from the oil feed valve; a dipstick for measuring the oil level in the tank, and which is housed in the tubular body and carried by the removable cover body; and a monostable valve controlled by the dipstick.

10 Claims, 2 Drawing Sheets

CAP FOR SAFELY FILLING AND CLOSING AN ENGINE OIL TANK, IN PARTICULAR OF AN AIRCRAFT ENGINE

The present invention relates to a cap for safely filling and closing an engine oil tank, in particular of an aircraft engine.

BACKGROUND OF THE INVENTION

Aircraft engines are known to employ so-called integrated engine oil tanks, i.e. comprising a funnel-shaped body inserted in fluidtight manner inside the tank through an inlet of the tank, and defining an oil feed conduit into the tank; a removable cover body for fluidtight closing one end of the funnel-shaped body; a dipstick housed inside the feed conduit; and a safety valve which prevents oil outflow from the tank along the feed conduit in the absence of the cover body closing the funnel-shaped body.

In known solutions, the safety valve is defined by a spherical body housed inside a bottom end portion of the feed conduit, and movable between a lowered position, allowing oil flow into the tank through the funnel-shaped body, and a raised position, preventing oil outflow along the feed conduit.

Though widely used, known caps of the above type are not altogether satisfactory in terms of performance. In particular, they make filling the tank difficult and slow, do not always allow the desired oil level to be reached inside the tank, and often make it difficult to determine the exact oil level.

This is mainly due to the design of the safety valve, and its location inside the funnel-shaped body. That is, being located at the bottom of the funnel-shaped body, i.e. far below the maximum oil level in the tank, the same safety valve allowing inflow of the oil also prevents air escaping from the tank, and therefore inflow of the oil into the tank, to the extent that the tank may seem full when it actually is not, thus endangering the engine.

SUMMARY OF THE INVENTION

It is an object of the present invention to provide a cap for safely filling and closing an engine oil tank, in particular of an aircraft engine, designed to provide a straightforward, low-cost solution to the above drawbacks, and which, in particular, provides for fast, complete filling of the tank, and trouble-free, accurate oil level measurement.

According to the present invention, there is provided a cap for safely filling and closing an engine oil tank, in particular of an aircraft engine, the cap comprising an elongated tubular oil feed body having a first end portion fitted in fluidtight manner to an inlet of said tank; a removable cover body for closing said first end portion; an oil feed valve fitted to the tubular body and movable between an open position, allowing oil flow into the tank, and a closed position, preventing oil outflow from the tank; and a dipstick for measuring the oil level in the tank, and which is housed in said tubular body and carried by said removable cover body; characterized in that said feed valve is located close to said first end portion; and by also comprising a monostable valve controlled by said dipstick.

In the cap defined above, the feed valve and monostable valve are preferably separate and spaced apart along said tubular body.

The tubular body conveniently comprises a second end portion opposite said first end portion and communicating with the inside of the tank; said monostable valve being carried by said second end portion.

The feed valve conveniently comprises a lateral opening formed through said tubular body; said opening extending in such a position as to have a passage portion unaffected by the oil and located above the maximum oil level in the tank.

Finally, the cap defined above conveniently comprises a filtering member located inside said tubular body, upstream from said feed valve in the oil flow direction into the tank.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
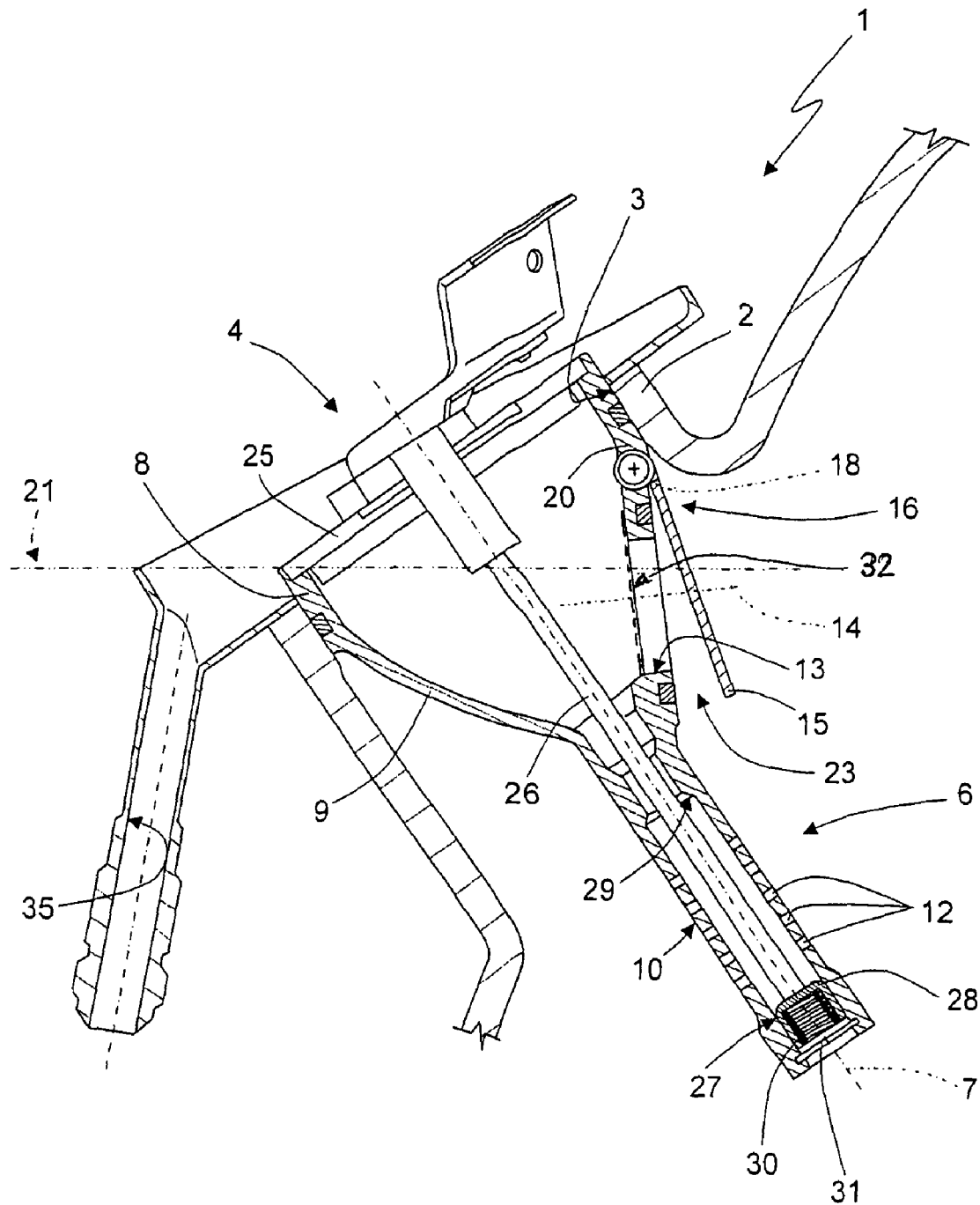
FIG. 1 shows a section of a preferred embodiment of the cap, for safely filling and closing an oil tank, according to the present invention and as fitted to an oil tank.
Figure 2:
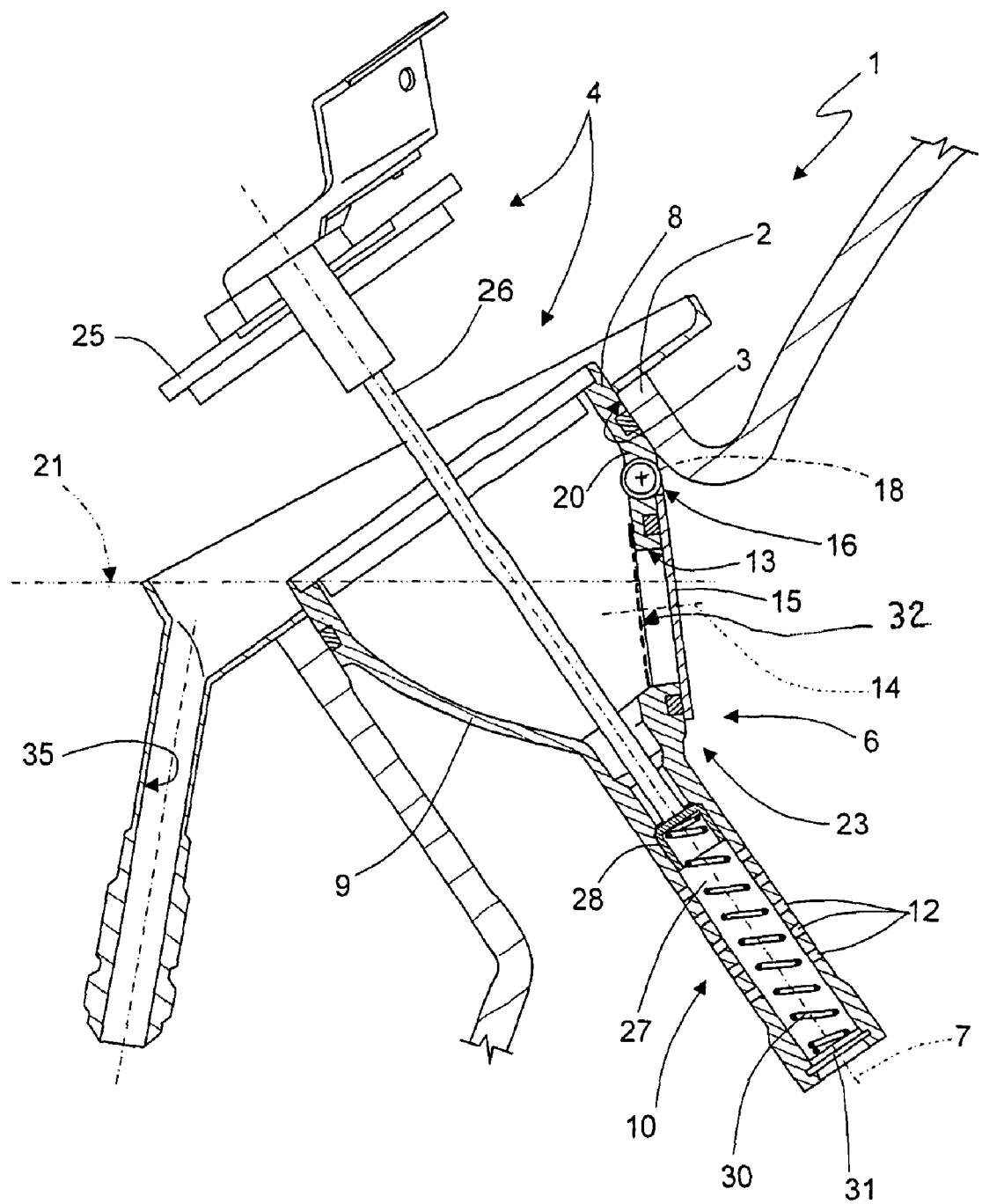
FIG. 2 shows the same view as in FIG. 1, of the FIG. 1 cap in a different operating position.

Number 1 in FIGS. 1 and 2 indicates as a whole an engine oil tank, in particular of an aircraft engine, comprising a collar 2 defining an inlet 3 of tank 1.

Inlet 3 is engaged by a cap 4 for safely filling and closing tank 1, and which comprises a funnel-shaped, elongated tubular body 6 having an axis 7 coaxial with the axis of inlet 3. Tubular body 6 in turn comprises a cylindrical end sleeve 8 inserted inside, and fitted in fluidtight manner to, collar 2; and an intermediate flared portion 9 connected at one end to sleeve 8, and at the other end to a cylindrical end portion 10 having a ring of radial through holes 12.

Flared portion 9 has a lateral opening 13 extending along an axis 14 crosswise to axis 7 of tubular body 6, and is fitted with a movable hinged flap 15 located on the outside of flared portion 9 and connected to portion 9 by a hinge device 16. Device 16 has a fixed hinge axis 18 adjacent to the inner axial end 20 of sleeve 8, and which extends perpendicular to axis 7 and above and parallel to a maximum oil level 21 in tank 1. Hinge device 16 allows flap 15 to rotate between an open position (FIG. 1) and a closed position (FIG. 2) opening and closing opening 13 respectively. Flap 15, in the open position, permits oil flow from tubular body 6 into tank 1, and, in the closed position—into which it is moved both by force of gravity and by the oil pressure inside tank 1—prevents oil flow from tank 1 to tubular body 6. Flap 15 thus cooperates with tubular body 6 and opening 13 in the tubular body to define a safety feed valve 23 allowing oil into but not out of tank 1.

Feed valve 23 is protected by a filter screen 32 located inside flared portion 9, at opening 13, and therefore upstream from valve 23 in the oil flow direction into the tank.

As shown in the attached drawings, cap 4 also comprises a known cover body 25, which engages and is fitted releasably and in fluidtight manner to sleeve 8.

Cover body 25 is fitted with a projecting dipstick 26 coaxial with axis 7 and for measuring the actual oil level in tank 1. Dipstick 26 is of such a length as to open a monostable valve 27, associated with cylindrical end portion 10, when cover body 25 engages sleeve 8 (FIG. 1).

Monostable valve 27 comprises an inverted-cup-shaped shutter 28 housed inside cylindrical portion 10 and fitted to portion 10 to slide axially between a forward disabling position preventing oil flow out of the tank (FIG. 2), and a withdrawn rest position allowing oil to circulate freely inside tubular body 6 (FIG. 1). In the forward disabling position, shutter 28 is forced against an annular shoulder 29 inside portion 10 by a helical spring 30 housed partly, at one end, inside shutter 28, and resting, at the other end, on a stop 31 fitted to portion 10, as shown in FIG. 2. In the withdrawn rest position, on the other hand, as shown in FIG. 1, shutter 28 is pushed by dipstick 26, in opposition to spring 30, and held in contact with stop 31, and spring 30 is housed completely inside shutter 28. The forward and withdrawn positions of shutter 28, and therefore location of shoulder 29 and stop 31, are designed so that the ring of radial holes 12 is located between said two positions.

In actual use, when cover body 25 is fitted to sleeve 8 of tubular body 6, valve 23 is closed by its own weight and by the oil pressure in the tank, and shutter 28 of monostable valve 27 is held in the withdrawn position by dipstick 26, thus permitting oil flow into tubular body 6 through holes 12, and immersion of the dipstick in the oil to permit easy, accurate measurement of the oil level.

If, for any reason, cover body 25 is removed from tubular body 6, withdrawal of dipstick 26 automatically results in spring 30 moving shutter 28 from the withdrawn to the forward position, thus automatically isolating tank 1 from the outside, by virtue of valve 23, as stated, also being closed.

When filling or topping up tank 1, cover body 25 is removed, shutter 28 of the monostable valve is set to the forward disabling position, for the reasons explained above, and oil flow into tubular body 6 rotates the flap anticlockwise in FIG. 2, so that oil flows straight into the tank through filter screen 32. As the oil flows in, the air inside the tank flows out freely, with no particular resistance, through the top portion of opening 13 unaffected by the oil flow, so that the tank is gradually filled to the desired level. In other words, providing an oil inflow opening located high up and defining an air outflow passage above the maximum oil level allows air to flow out freely until the flap eventually closes opening 13 completely.

Being opened directly by dipstick 26, the monostable valve provides for safely closing the tank when cover body 25 is removed from tubular body 6.

When filling the tank, any surplus oil in tubular body 6 is drained off to the outside by an overflow conduit 35.

Clearly, changes may be made to cap 4 as described herein without, however, departing from the protective scope defined in the accompanying Claims. In particular, feed valve 23 may be formed differently from the one shown by way of example, providing it permits free outflow of air from the tank, even when the oil level in the tank is close to maximum.

Similarly, the valve preventing oil outflow in the absence of cover body 25, i.e. when dipstick 26 is withdrawn, may also be formed differently from the one shown.

The invention claimed is:

1. A cap (4) for safely filling and closing an engine oil tank (1), the cap (4) comprising an elongated tubular oil feed body (6) having a first end portion (8) fitted in a fluidtight manner to an inlet (3) of an engine oil tank (1); a removable cover body (25) for closing said first end portion (8); an oil feed valve (23) fitted to the tubular body (6) and movable between an open position, allowing oil flow into the tank, and a closed position, preventing oil outflow from the tank; and a dipstick (26) for measuring the oil level in the tank, and which is housed in said tubular body (6) and carried by said removable cover body (25); wherein said feed valve is located close to said first end portion, said cap also comprising a monostable valve (27) controlled by said dipstick (26), wherein
said feed valve comprises a lateral opening (13) formed through said tubular body, said opening (13) extending in such a position as to have a passage portion unaffected by the oil and located above the maximum oil level (21) in the tank,
said feed valve further comprises a movable flap (15) closing said opening,
said movable flap is hinged to said tubular body to rotate about a hinge axis (18) perpendicular to an axis (7) of said tubular body, and
said hinge axis extends above the oil level in said tank.

2. A cap as claimed in claim 1, wherein said feed valve and said monostable valve are separate and spaced apart along said tubular body (6).

3. A cap as claimed in claim 1, wherein said tubular body comprises a second end portion (10) opposite said first end portion and communicating with the inside of the tank, said monostable valve being carried by said second end portion.

4. A cap as claimed in claim 3, wherein said monostable valve (27) is housed inside said second end portion (10) of said tubular body.

5. A cap as claimed in claim 4, wherein said monostable valve comprises a shutter (28) movable axially inside said second end portion; and an elastic thrust member (30) for holding said shutter in a closed position preventing oil outflow from the tank; said dipstick exerting pressure, in opposition to that exerted by the elastic member, to hold the shutter in a rest position connecting the inside of the tubular body to said tank.

6. A cap as claimed in claim 5, wherein the shutter is a hollow shutter; and, in said rest position, the elastic member (30) is housed completely inside said shutter.

7. A cap as claimed in claim 5, wherein said second end portion has a number of radial passages (12) connecting the tank to the inside of the tubular body; said passages being formed along the portion traveled by said shutter when moving between said rest position and said closed position.

8. A cap as claimed in claim 1, wherein, when fitted to said tank, said hinge axis extends parallel to the maximum oil level in the tank.

9. A cap as claimed in claim 1, wherein said movable flap is located on the outside of said tubular body.

10. A cap as claimed in claim 1, further comprising a filtering member (32) located inside said tubular body (6), upstream from said feed valve in the oil flow direction into the tank.

* * * * *